United States Patent Office 3,228,118
Patented Jan. 11, 1966

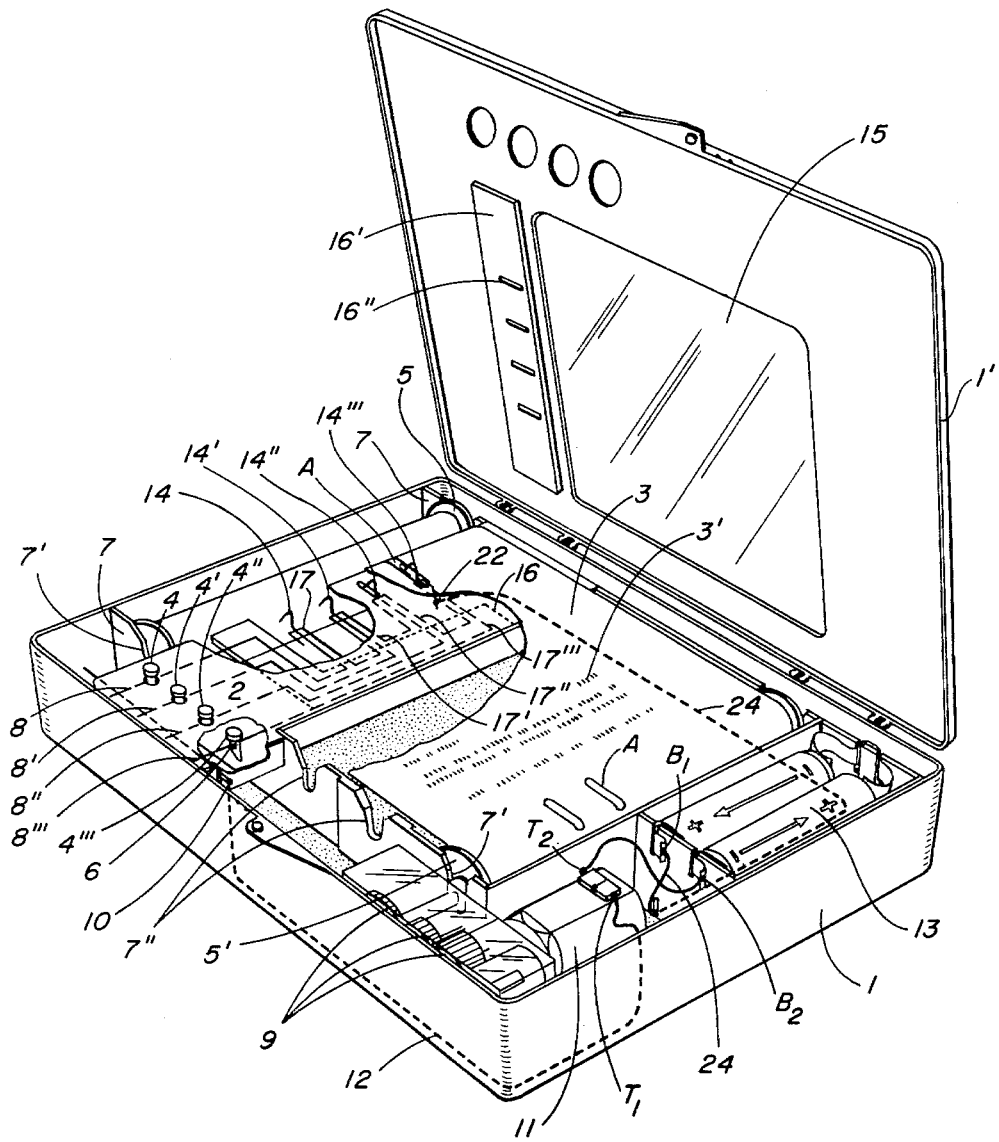
PARKER W. HIRTLE,
INVENTOR.
BY Rines and Rines
ATTORNEYS

3,228,118
TEACHING MACHINE AND THE LIKE
Parker W. Hirtle, Lexington, Mass., assignor to Prototech Incorporated, Cambridge, Mass., a corporation of Massachusetts
Filed Apr. 9, 1962, Ser. No. 186,090
11 Claims. (Cl. 35—9)

The present invention relates to teaching machines and similar apparatus, and, more particularly, to automatically operative devices of this character.

The art is replete with various types of electrically and otherwise-operated toys, games, and instructional devices that enable a user to select alternative responses or to obtain an indication as to whether a particular selection or answer to informational material is or is not correct. There has been considerable interest of late years in adapting devices of this kind for serious study purposes by students and others; and, therefore, a requirement has developed for a much more sophisticated, fool-proof, and multi-function device of this character.

Very complicated and expensive teaching machines have been evolved that provide instructional material and then permit the selection of an answer to questions, with provision for indications as to whether the question has been correctly answered, and further provisions for side-tracking from the general train of instruction in the event that the question has been improperly answered. An object of the present invention, however, is to provide a new and vastly improved teaching machine and the like of the above-described character that, while providing the required sophistication, reliability and multi-purpose functions previously discussed, is constructed in an inexpensive, simple and fool-proof manner that enables the utilization of the device in places where the cost of conventional teaching machines would be prohibitive.

A further object is to provide a new and improved teaching machine or the like of more general utility, also.

Still an additional object is to provide a novel information-imparting apparatus.

In summary, from one of its broad aspects, the invention relates to apparatus having, in combination, a medium containing informational material and mounted within a housing having means for permitting access to successively disposed portions of the material. Driving means is provided that is adapted, when operative, relatively to move the medium with respect to the housing in order to bring selected portions of the material to the access-permitting means. A plurality of preferably switching means, each independently operative to render the driving means operative and inoperative, is correlated and cooperative with preferably aperture means provided upon the medium and corresponding to predetermined responses to informational material for enabling relative movement of the medium a predetermined distance upon the operation of that one of the said plurality of means corresponding to a predetermined response; and means is further provided for preventing such movement upon operation of any of the other of the said plurality of means. Preferred constructional details are hereinafter set forth.

The invention will now be described in connection with the accompanying drawing, the single figure of which is an isometric view, partly broken away to show details of construction, illustrating the invention in preferred form.

A housing 1, in the form of a box having a hinged cover 1', is shown containing a continuous belt or other medium 3 provided with informational material 3', such as, for example, questions and answers. The medium 3 is mounted between a supply reel 5 and a driven take-up reel 5', the terminal axis portions of which are supported in slots 7' provided in spaced parallel compartment walls 7. The take-up reel 5' may be operated through a gear train 9 that is rendered operative upon the energizing of an electric motor 11 from small portable-radio or similar batteries 13. The cover 1' is provided with an aperture or window 15 in its otherwise preferably opaque surface, through which access is provided to preselected successively disposed portions of the informational material 3' upon the medium 3. Additional rolls or belts of instructional material may be stored under the belt 3 between the slots 7''.

A first plurality of electric switches is shown at 2 comprising insulating push-buttons 4, 4', 4'' and 4''', each in the form of tapered pegs having slots 6 through which resilient wire conductors 8, 8', 8'' and 8''' respectively pass. The resilient character of the wires 8, 8', 8'', and 8''' permits a measure of resiliency upon the depression of the respective buttons 4, 4', 4'', and 4'''. In such depressed position, each button will effect electrical contact between the free ends of the corresponding conductors 8, 8', 8'', 8''' and a common bar connection 10 that is further connected by conductor 12 to one terminal $T_1$ of the motor 11.

Associated with and connected to each of the switch conductors 8, 8', 8'' and 8''' is a resilient vertically oriented loop, shown at 14, 14', 14'' and 14''', respectively, that is secured, as by a cemented or clamped insulator strip 16, to permit resilient vertical movement of the loops 14, 14', 14'' and 14''' for a further switching purpose, later explained. Below these loops and normally out of electrical contact therewith, is a corresponding plurality of horizontally mounted loops 17, 17', 17'' and 17''', all interconnected and terminating in a downward terminal portion 22 that connects, by conductor 24, to one of the terminals $B_1$ of the batters 13. Vertical depression of any of the loops 14, 14', 14'' and 14''' will thus establish a switch connection with the respective corresponding members 17, 17', 17'' and 17''', and thus with the battery terminal $B_1$. The other battery terminal $B_2$ is connected at 18 to the other motor terminal $T_2$.

Thus, if button 4 is depressed, electrical contact is made between conductor 8 and conductor 10 and, therefore, with the motor terminal $T_1$. If loop switch 14 is depressed, then, into engagement with the horizontal loop 17 therebelow, electrical connection is established from conductor 8 through 14 and 17 to terminal 22 and thence by way of conductor 24 to the battery terminal $B_1$. The motor 11 will then be rendered operative through energization with electric energy from the batteries 13, driving the belt medium 3 to advance or move the same upon the take-up reel 5'. Similarly, the depression of each of buttons 4', 4'', and 4''' will operate the motor 11 if the corresponding vertical loop switch 14', 14'', or 14''' is depressed. The release of any of the independently operative switches 14, 14', 14'', 14''', however, interrupts the feeding of electric energy to the motor 11 and will make it impossible for the depression of the corresponding buttons 4, 4', 4'', or 4''' to advance the belt medium 3. With the medium 3 tightly drawn over and engaging the loop switches 14, 14', 14'', and 14''', therefore, the depression of one of the buttons 4, 4', 4'', and 4''' will actuate the motor 11. A strip 16' on the cover, provided with recesses 16'' at the regions of the loops 14, 14', 14'' and 14''' will assist in holding the belt 3 against the loops when the cover 1' is closed.

If, however, an aperture is provided, as at A, in a position correlated with the position of one of the loop switches 14, 14', 14'', or 14''', then that loop will resiliently rise through the aperture and out-of-contact with the battery terminal $B_1$, so that depression of the button corresponding to that belt aperture A will not permit activation of the motor 11 and further advancement of the belt.

Thus, by proper coding of apertures A, the depression of only a preselected button or buttons will permit advancement of the belt past the window 15. If the material at 3' is a question, the coded apertures A can thus prevent advancement until the right predetermined answer (as determined by the selection of the right button to depress) is given by the operator. If the correct answer is indicated by button 4, for example, apertures A above each of the loops 14', 14" and 14''' will prevent advancement of the belt 3 unless button 4 is depressed.

Assuming such correct answer and depression of the proper button, the belt 3 will be advanced any preselected or predetermined distance until the next set of coded apertures passes over the switching loops 14, 14', 14" and 14''' (as shown at A above the reel 5), preventing further movement of the medium and thus enabling the next question to be studied through the window 15. By proper positioning of apertures, moreover, advancement different distances can obviously be effected, as for the purpose of exposing more instructional material to explain the correct answer before proceeding to the next question. An aperture-set between the left-hand and right-hand aperture-sets A could, for example, effect such a result.

Clearly, other types of substitute structures may be employed, including spring operation and the use of detents or the like for providing coding of the belt movement; but the electric motor and the above simplified-construction with aperture codes upon the belt itself are believed to be preferable. Other media besides belts may obviously also be employed, and further modifications will occur to those skilled in the art, such being considered to fall within the spirit and scope of the invention as defined in the appended claims.

As referred to in the claims, each pair of switches comprises a selector switch, such as 4, 8, 10, and a control switch, such as 14, 17. The apertures A constitute circuit breaking means, and the belt material extending along the belt 3 in the direction of movement for a predetermined distance, corresponding to that between successive portions of the informational material to be viewed, constitutes control path means.

What is claimed is:

1. Apparatus of the character described having, in combination, a medium containing informational material, a housing, said medium being mounted within said housing, said housing having means for providing visual access to portions of said material, said housing having driving means adapted to move said medium past said access providing means, said housing having a plurality of pairs of switch means each of which pairs represents a predetermined response to said informational material and each of which pairs is adapted, when operated, to cause said driving means to move said medium, said medium having control path means extending a predetermined distance along said medium in the direction of movement, corresponding to the distance between successive portions of said informational material to be viewed, for rendering one of said pairs of switch means operative to cause said driving means to move said medium said predetermined distance, said medium having circuit breaking means for simultaneously rendering others of said pairs of switch means inoperative to cause said driving means to move said medium said distance, said medium further having circuit breaking means disposed on said medium at the termination of said path means for causing said operative pair of switch means to be rendered inoperative whereby movement of said medium is stopped and at least one of said others of said pairs of switch means is prepared for operation.

2. The apparatus of claim 1, said medium having additional control path means extending a different distance along said medium in the direction of movement for rendering at least one of said others of said pairs of switch means operative to cause said driving means to move said medium said different distance, and at least one of the first-mentioned circuit breaking means being disposed on said medium at the termination of said additional control path means.

3. The apparatus of claim 1, the first-mentioned circuit breaking means being disposed on said medium for rendering said others of said pairs of switch means inoperative when said control path means renders said one of said pairs of switch means initially operative.

4. The apparatus of claim 1, said apparatus being a teaching machine, said access providing means comprising a window in said housing, one of the switch means of each pair being a manually operable selector switch.

5. The apparatus of claim 4, said medium being in the form of a belt of sheet material.

6. The apparatus of claim 5, said circuit breaking means comprising apertures in said belt.

7. The apparatus of claim 1, said driving means comprising an electric motor, each pair of switch means being connected in series and adapted to complete an energization circuit for said motor when that pair of switch means is operated.

8. The apparatus of claim 1, said medium being in the form of a belt of sheet material, said circuit breaking means comprising apertures in said belt, said driving means comprising a battery-operated electric motor, one of the switch means of each pair being a control switch having actuator means for engaging the material of said belt to close that switch and for entering an aperture to open that switch, the other of the switch means of each pair being a normally open selector switch in series with the control switch of that pair, the simultaneous closing of the switches of any pair being adapted to complete an energization circuit for said motor.

9. The apparatus of claim 8, said control switches being arranged in a row transversely of the movement of said belt.

10. The apparatus of claim 8, each of said actuator means comprising a resiliently mounted vertical loop.

11. The apparatus of claim 8, each of said selector switches comprising a slotted insulating push-button receiving a resilient conductor.

References Cited by the Examiner
UNITED STATES PATENTS

| | | | |
|---|---|---|---|
| 2,953,859 | 9/1960 | Fink | 35—9 |
| 2,965,975 | 12/1960 | Briggs | 35—9 |
| 2,983,054 | 5/1961 | Twyford | 35—9 |
| 3,096,592 | 7/1963 | Schuster | 35—9 |

EUGENE R. CAPOZIO, *Primary Examiner.*

LEO SMILOW, JEROME SCHNALL, *Examiners.*